April 25, 1967

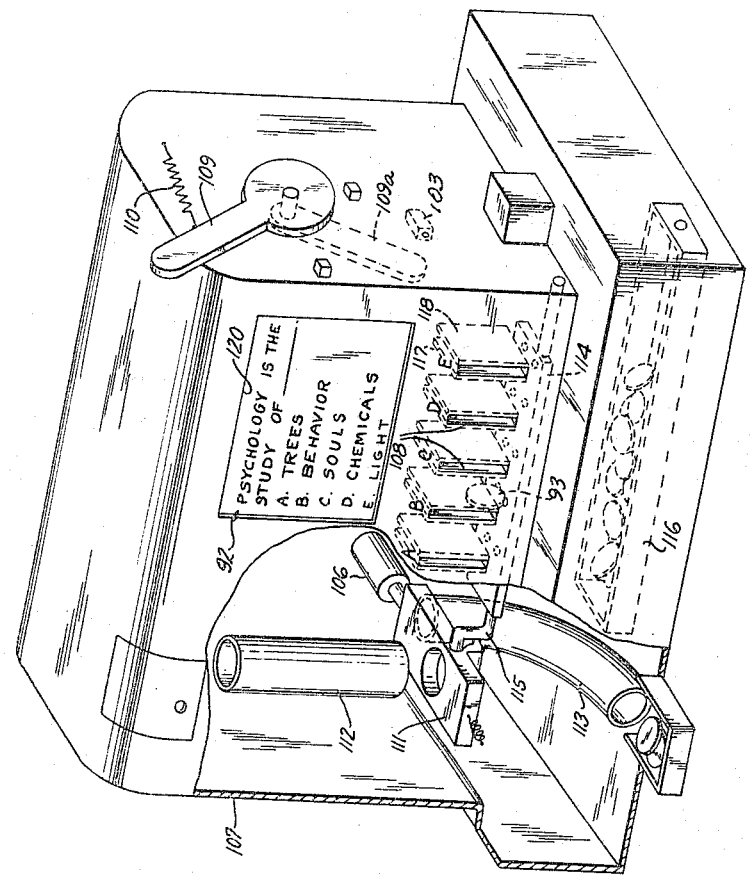

A. L. DIAMOND 3,315,373

COIN CONTROLLED EDUCATIONAL DEVICE

Filed Feb. 23, 1966

INVENTOR.
A. LEONARD DIAMOND

BY

Curtis, Morris + Safford
ATTORNEYS

April 25, 1967 A. L. DIAMOND 3,315,373
COIN CONTROLLED EDUCATIONAL DEVICE
Filed Feb. 23, 1966 3 Sheets-Sheet 3
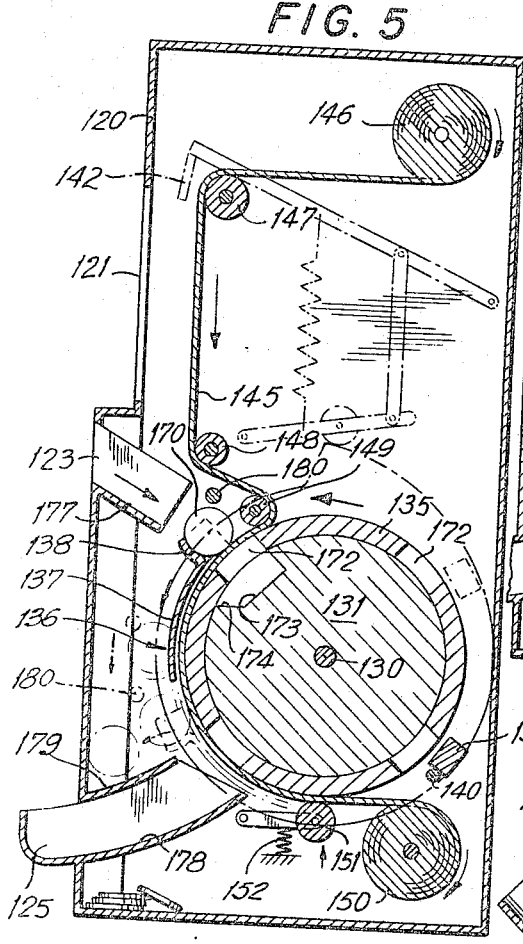
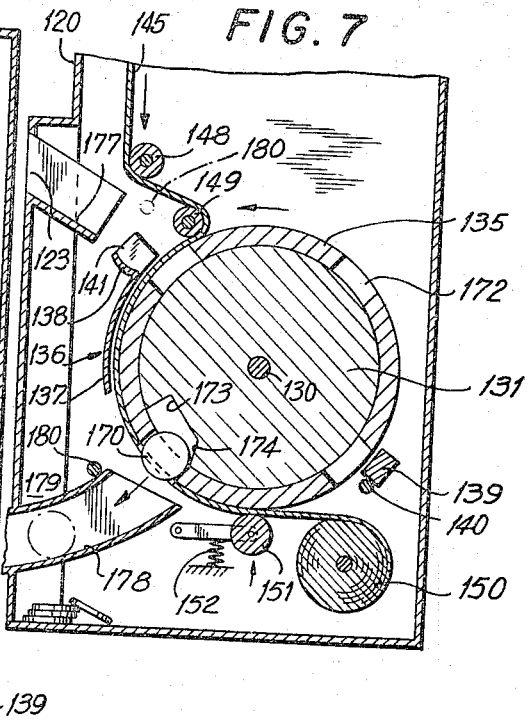
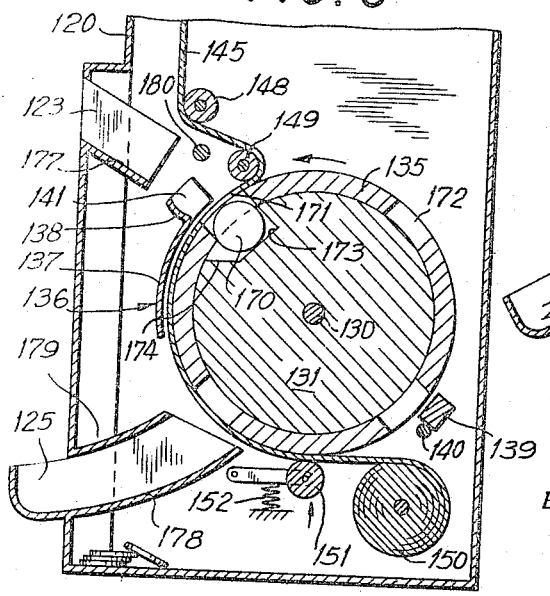
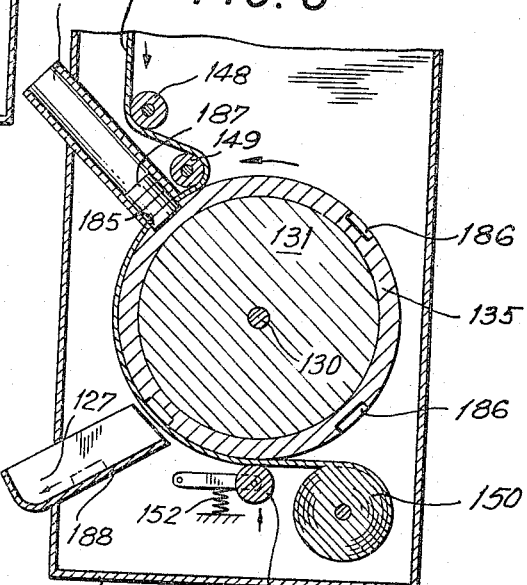
INVENTOR.
A. LEONARD DIAMOND
BY
Curtis, Morris & Safford
ATTORNEYS

United States Patent Office 3,315,373
Patented Apr. 25, 1967

3,315,373
COIN CONTROLLED EDUCATIONAL DEVICE
Aaron Leonard Diamond, 4626 Moho St.,
Honolulu, Hawaii 96816
Filed Feb. 23, 1966, Ser. No. 529,395
13 Claims. (Cl. 35—9)

The present invention relates to educational devices and more particularly to improvements in devices for assisting an individual in learning or for testing his knowledge. The instant application is a continuation-in-part of my prior application Ser. No. 294,440 filed July 11, 1963, now Patent No. 3,246,402, and entitled, Educational Device, and relates to said application for all common subject matter.

Educational devices for assisting individuals in learning have heretofore been provided, but they have not been used extensively because they either fail to produce a motivating appeal in the individual, usually a child, or are so complicated or expensive as to bar them from common use. The deficiencies of prior machines extend from those used by children of preshcool age in learning, for example, how to spell simple words, to the more sophisticated types of machines used by adult student in answering, for example, multiple choice questions.

One of the objects of the present invention is to provide an educational device of the type indicated, for either simple or complex exercises, which may be manufactured and sold at a relatively low cost to adapt them for extensive use.

Another object is to provide an educational device of the type indicated which is in the nature of a game to provide a strong motivating appeal to the operator, discourage guessing and automatically controlled to actuate a reinforcing mechanism and advance successive problems to be solved by the operator of the device.

Another object is to provide an educational device of the type indicated which is adapted for a number of different uses such as progressively solving successive steps of a single problem or selecting a single one of a plurality of answers to a multiple choice question either for teaching or for testing.

Still another object is to provide an educational device of the type indicated which is of relatively simple construction and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a perspective view of one form of a coin-controlled mechanism incorporating novel features of the present invention;

FIGURE 2 is a perspective view of a machine incorporating the coin-controlled mechanism of FIGURE 1 for learning or testing by multiple choice questions;

FIGURE 5 is a transverse sectional view taken on line 5—5 of FIGURE 3 and showing the relationship of the web to one window in the casing and the coin resting on the web when inserted in the wrong slot;

FIGURE 6 is a view similar to FIGURE 5 showing the position of the coin when inserted in the proper slot as resting in a pocket in the manually operated drive cylinder;

Figure 3:
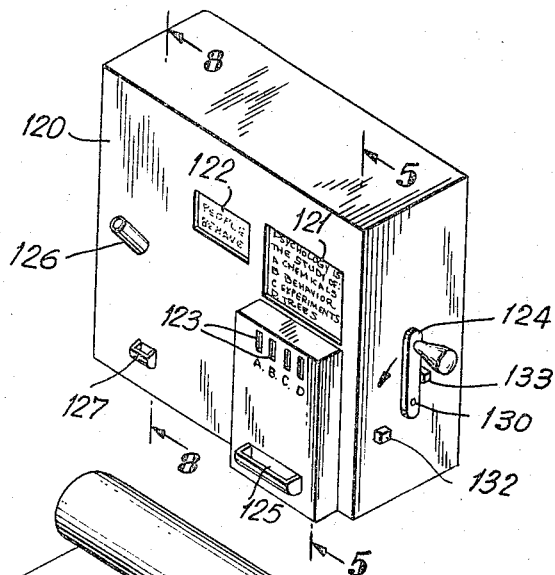
FIGURE 3 is a perspective view of a modified form of coin-controlled machine which is manually operated and showing the arrangement of the plural windows, coin slots and operating handle.

FIGURE 7 is a view similar to FIGURES 5 and 6 and showing how the coin operates as a key to lock the web operating sleeve and driving cylinder for rotation as a unit; and FIGURE 8 is another sectional view taken on line 8—8 of FIGURE 3 to show the openings in the web for dispensing a reward or reinforcement, when a correct slot is selected, and the radial arm for moving the shutter to open position each time the machine is operated.

Referring now to the drawings, a manually-operated coin-controlled apparatus is illustrated for producing a strong motivating appeal to the individual operating the machine. This type of apparatus simulates a well known coin operated game which appeals to a large group of individuals. However, instead of moving cylinders with matching indicia into line, the device operates a web such as illustrated in FIGURE 1 to present an indication of whether a particular question has been answered correctly, or not, and if so presents a new question and multiple choice answers. For simplicity of explanation the invention is shown applied to a machine for operating such a web, but it will be understood that it could be used to operate cylinders or cards having indicia such as the letters of the alphabet and the numerals 0 to 9 printed thereon.

The coin-controlled apparatus is in the nature of a game and it "pays-off" with a return of the coin inserted as well as additional coins as a reward for correct answers to provide an incentive to learn the material presented by the machine and discourage guessing. The term "coin" and "coin-operated" as used in the specification and claims is intended to include, in addition to actual coin, other tokens such as metal slugs of any shape or size and other objects such as marbles, or any shape or size that can be used to control operation, or which will operate as a key in suitably designed parts to lock them together for movement as a unit.

FIGURE 1 illustrates how movement of a continuous web 92 is controlled by a metal slug 93 and an aperture or opening 94 in the web. In this construction, a contact bar 96 is connected to an electric motor 97 for winding a reel. However, in FIGURE 1 each of the contacts 95 is electrically connected to one contact 100 of a corresponding pair of spaced contacts on a terminal board 98, respectively, and the other contact 101 is connected to a common bus bar 102. One pair of spaced contacts 100 and 101 is provided for each contact 95 corresponding to a particular one of a pluarilty of multiple choice answers. The contacts 101 and 102 of each pair are so spaced as to be bridged by the metal slug 93 as illustrated in FIGURE 1. The common bus bar 102 also includes a manually operable control switch 103.

When the operator decides on a particular answer he inserts the metal slug 93 to bridge the contacts 100 and 101 of the branch circuit connected to the particular contact 95 corresponding to the answer selected. The manually operable control switch 103 is then closed and if the contact 95 corresponding to a wrong answer has been selected, then nothing happens. However, if the contact 95 corresponding to the right answer has been selected, a circuit is completed from bus bar 102 through contacts 101 and 100 to contact 95 and through aperture 94 in web 92 to bar 96 to motor 97 to initiate the latter and turn the reel. The web 98 then is advanced to present the next question and the multiple choice answers.

In addition, the electric circuit illustrated in FIGURE 1 includes an additional contact 104 aligned with an additional aperture 105 in the web 92 for operating auxiliary mechanism, such as reinforcing means, after a number of questions are answered correctly, for example, five questions. An electric winding 106, such as a solenoid, is also shown diagrammatically in FIGURE 1 for operating the auxiliary mechanism.

FIGURE 2 illustrates a type of machine in which the web driving and control mechanisms illustrated in FIGURE 1 may be incorporated. This machine comprises a casing 107 having a window opening 120 through which the problem and multiple choice answers on the web 92 may be observed. Positioned in the casing below the window opening 120 are a plurality of slots 108, one for each of the plurality of multiple choice answers, which are adapted to receive metal slugs 93. An arm 109 is provided at one side of the machine which may be manually operated against the action of the spring 110. Arm 109 is connected to an arm 109a at the inside of the casing which engages and closes switch 103, referred to with respect to FIGURE 1, to complete an electric circuit to the motor 97 if a metal slug 93 has been inserted in the proper slot 108.

The completion of the circuit energizes solenoid winding 106 and the solenoid is connected to actuate a slide 111 for moving a slug from a magazine 112 into alignment with a chute 113 for delivery to the exterior of the machine. The arrangement may be such that when each correct answer is completed the aperture 105 in web 92 will be so positioned that solenoid 106 will be actuated, or the arrangement may be such that for each third or fifth answer only will the aperture 105 occur to energize solenoid 106. While the space contacts 100 and 101 on the terminal board 98 are shown directly connected to the contacts 95 and bus bar 102, for purposes of illustration, the plurality of spaced terminals are preferably mounted on a pivotally mounted platform 114, see FIGURE 2, which makes contact with leads from the contacts and bus bar in the position illustrated and rocks to a circuit breaking position.

To operate the machine illustrated in FIGURES 1 and 2 a metal slug is inserted in a slot 108 which the player believes to correspond with the correct answer and the arm 109 of the machine is actuated. Movement of the arm 109 closes the control switch 103 and if the metal slug is in the proper slot completes the circuit between the terminals 100 and 101 to the contact 95 in alignment with the aperture 94 in the web 92 to complete an electric circuit from a source of power. Completion of the electric circuit energizes the electric motor 97 which begins to move the web 92 to present a new problem.

Movement of the web causes the opening of the circuit at contact 95 and aperture 94; but first it closes the motor-energizing circuit through contact 99 and bar 96, as tab 58 moves downward. The web 92 continues to move until the next tab 58 breaks this latter circuit. A new problem, with a new correct aperture 94, is then positioned in window 120 in FIGURE 2.

When the circuit through contact 99 and bar 96 is completed, moreover, a solenoid means (not shown) is energized to rock the pivotally mounted platform 114 in FIGURE 2 through an angle of 90°. This causes the metal slugs to roll from the platform into the draw 116. Platform 114 repositions horizontally when the next tab 58 stops between contact 99 and bar 96.

Figure 4:
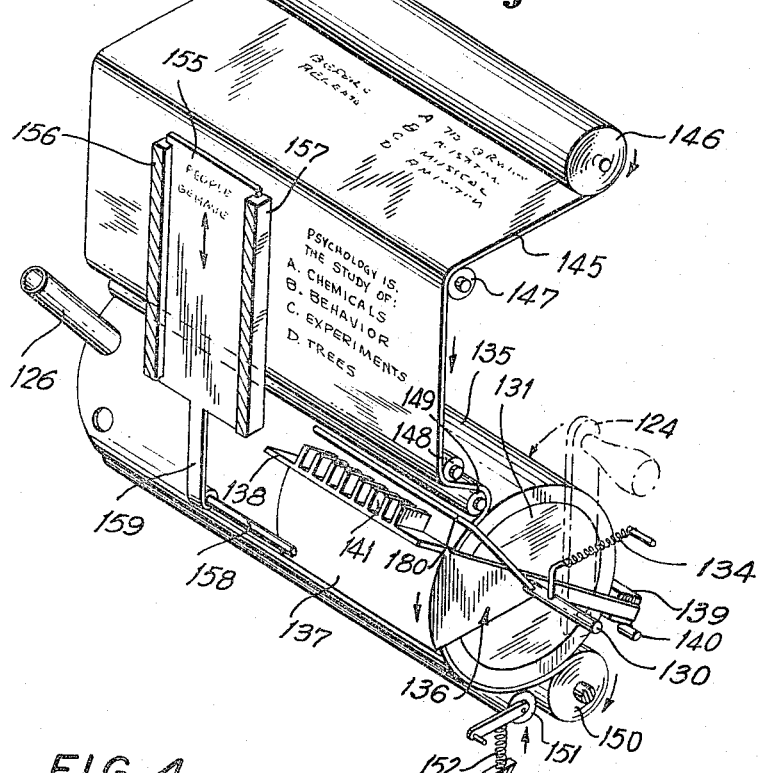
FIGURE 4 is a perspective view of the machine illustrated in FIGURE 3 with the outer casing removed to show the arrangement of the operating mechanism.

FIGURES 3 to 8 illustrate a machine of modified construction which is also coin-controlled but also manually operated. Referring now to FIGURES 3 and 4, the machine comprises an enclosing casing 120 having a normally open window opening 121 in which suitable indicia is displayed as, for example, a multiple choice question, and a normally closed window opening 122 which gives an indication if the problem is answered incorrectly. Below the window opening 121 are slots 123 corresponding to the multiple choice answers in the window opening 121 and at the side of the machine is a handle 124. Below slots 123 is a tray 125 into which coins are delivered when a coin is inserted in a slot corresponding to the right answer. Also, a magazine 126 for reward or reinforcement coins is provided as well as a tray into which such coins are delivered, tray 127. As thus far described the machine is generally similar to the one illustrated in FIGURE 2.

In the form of machine illustrated in FIGURES 3 to 8 the handle 124 is connected to shaft 130 projecting from and fast with a drive cylinder 131, see FIGURE 4. Each time the handle is pulled manually or by another source of power it rotates the drive cylinder 131 through 90° and the movement of the handle is limited by the stops 132 and 133, see FIGURE 3. When the handle 124 is released, it is returned, together with the shaft 130 and drive cylinder 131 to which it is connected, by a spring 134. Surrounding the drive cylinder 131 is a web feeding sleeve 135 which is freely rotatable on the cylinder. Freely rotatable on the shaft 130 at the end of the cylinder 131 and sleeve 135 is a cross-piece 136 having a longitudinally extending arcuate member 137 projecting longitudinally from one end and overlying the peripheral surface of the web drive sleeve 35. Member 137 provides a support for a radially extending plate 138 at its upper edge. The opposite end of the cross-piece 136 has a counterweight 139 which engages a stop 140 to normally hold the plate 138 in an upwardly inclined position as shown in FIGURES 4 and 5. Short walls, 141 project upwardly from plate 138 to form slots therebetween constituting a continuation of slots 123 in the casing 120.

A web 145 having the indicia displayed in the window openings 121 and 122 feeds off a reel 146, then over vertically spaced guide rolls 147 and 148 at the top and bottom of window openings, see FIGURES 4 and 5, over a rearwardly offset roll 149 overlying the top of the sleeve 135 and then wraps around the front curved surface of the sleeve for approximately 160°. The opposite end of the web 145 pays off the sleeve 135 in a substantially horizontal direction onto a take-up reel 150. While not shown, it will be understood that the reels 146 and 150 will be suitably biased to pay off and take up slack as the web is advanced by rotation of the sleeve 135. A roll 151 is pressed into engagement with the web 145 by a spring 152 to hold the web in firm engagement with the sleeve while the latter rotates. The web 145 has indicia marked thereon in alignment with the window opening 121 presenting a problem, such as a multiple choice question, and indicia in alignment with the window opening 122.

Movement of the sleeve 135 with the drive cylinder 131 is controlled by the coin 170 and an aperture slot 171 in the web 145, see FIGURE 6, in alignment with a particular slot 123 corresponding to the correct answer. If the coin 170 is inserted in the wrong slot it is prevented from passing through the web 145 and is discharged therefrom when the handle 124 is actuated. If the coin 170 is inserted in slot 123 corresponding to a correct answer it passes through the aperture 171 in the web and acts as a key to lock the drive cylinder 131 and sleeve 135 for rotation together as a unit to advance the web and present a new problem in the window opening 121.

The structure of the elements constituting the control mechanism is shown clearly in FIGURES 5 to 7. The sleeve 135 has openings 172 therein arranged 90° apart around its periphery. Each opening 172 is of a width to accommodate a coin and a length to underlie all of the slots 123. Thus, opening 172 is adapted to underlie the slot 171 in the web 145. Also, drive cylinder 131 has a recess 173 underlying one opening 172 in the sleeve in its initial rest position as illustrated in FIGURE 5. As will be observed, the recess 173 is of such a depth that the coin projects radially from the periphery of the drive cylinder 131 into the opening 172 in the sleeve 135 and acts as a key for locking the sleeve for rotation with the drive cylinder. Recess 173 also has an edge 174 inclined forwardly in the direction of rotation to facilitate the discharge of a coin at the end of a quarter revolution as illustrated in FIGURE 7.

As shown in FIGURES 5 to 7, a chute 177 is provided at the rear of the slots 123, see FIGURE 3, for directing coins inserted in any particular slot onto the plate 138. The coins are held in alignment with a slot 123 by the space plates 141, see FIGURE 4, so that the alignment between the slots 123 and the aperture slot 171 in the web 145 will be maintained.

Positioned below the chute 177 is a chute 178 adjacent the periphery of the sleeve 135 but displaced 90° from the chute 177. The outlet from the chute 178 opens into the tray 125, previously described with respect to FIGURE 3. The space between the lower wall of chute 177 and upper wall of chute 178 forms a pocket or closed chamber 179 for accumulating "error" coins not dispensed through the chute 178.

When a coin 170 is inserted in a slot 123 corresponding to a wrong answer the coin is prevented from movement inwardly by its engagement with the web 145. In this position the coin projects outwardly from the web 145 beyond the outer edge of the plate 138. A bail 180 has an arm projecting radially from the drive shaft 130, see FIGURE 4, and an extension extending at right angles parallel to the periphery of the sleeve 135. As will be observed by reference to FIGURE 5, the longitudinally extending arm of the bail 180 is located beyond the radial extent of the plate 138 so that if no coin is present it will move by the plate, but is so located as to engage the radially projecting edge of a coin when supported on the web 145 as shown in FIGURE 5. Thus when the handle 124 is pulled downwardly from the positions shown in FIGURES 3, 4 and 5 and a coin 170 is supported on the plate 138, the coin, plate and cross member 136 will be moved down to the dot and dash line positions illustrated in FIGURE 5 to dump coin in the pocket 179. However, when a coin 170 is inserted in the slot 123 corresponding to the right answer, as shown in FIGURE 6, the coin passes through the chute 177, across the plate 138, through slot 171 in the web 145, opening 172 in the sleeve 135 and into the recess 173 in the drive cylinder 131 as shown in FIGURE 6. The coin 170 then acts as a key to lock the drive cylinder 131 and sleeve 135 together for rotation to the position, and the bail 180 moves relative to the plate 138 without actuating the latter, as shown in FIGURE 7. In its rotated position the coin 170 then rolls out of the recess 173 and openings 172 and 171 and then through chute 178 and into the tray 125.

The web 145 and sleeve 135 also have openings 185 and 186 which align to receive coins or other tokens 187 from the magazine 126 as shown in FIGURE 8. The sleeve 135 may have a recess 186 for each of the four positions of the drive cylinder 134 or may have, for example, a single recess for each complete revolution for the sleeve 135. Furthermore, the web 145 may have any desired number of openings 185 to produce a reward for any multiple number of right answers. It will be understood that the sleeve 135 only rotates when a correct answer is selected so that the reward may become some proportional part of the number of coins 170 inserted in the slots 123. In other words, if only one reward is given for each eight questions presented, and it has a value corresponding to the coin insert in the slots 123, and the web 145 has a slot 185 for each eighth question answered, the operator could put in any number of coins for wrong answers and lose the coins in the pocket 179 before any reward 187 is delivered to the sleeve 135. When a reward token 187 is positioned in the sleeve 135 and the drive cylinder 131 is operated, the reward will be delivered through a chute 188 into the tray 127 as shown in FIGURE 8 in a manner similar to the coins 170 in FIGURES 5 to 7.

A person using the machine reads the question printed on the web 145 in the window opening 121 and comes to a conclusion as to the right answer. He then inserts a coin in the slot 123 corresponding to the answer which he has selected and then pulls the handle 124 through a 90° arc. If a wrong answer and correspondingly wrong slot 123 has been selected the coin rolls through the chute 177, see FIGURE 5, and against the web 145 which retains it on plate 138 of the cross member 136 as shown in FIGURE 5. When the handle 124 is pulled, the drive cylinder 131 and bail 180 are rotated through 90°. Bail 180 engages the outer periphery of the coin 170 and rocks it together with the plate 138 and cross piece 136 from the position shown in full lines to that shown in dash lines in FIGURE 5 where it dumps the coin into the pocket 179. During such movement of the handle 124, the sleeve 135 remains stationary so that the same question remains in the window opening 121.

As plate 138 and arcuate member 137 are rocked downward, however, rod 158 pulls flexible coupling 159 in FIGURE 4 downward to actuate the shutter 155 downwardly to reveal in window 122 information helpful to the learner in choosing the correct answer. Information such as "people behave" gives the learner a cue to the correct answer. Such cue or error information is known to help and stimulate the learning process.

As handle 124 is released and bail 180 moves upwards, coin 170 is dumped in the pocket 179. Plate 138, arcuate member 137 and rod 158 then move upwards causing shutter 155 to close and cover the error information. It should be noted that with this mechanism, shutter 155 can never be opened unless the learner makes an error by inserting a coin into an incorrect slot. Also, since coin 170 rolls off plate 138, when handle 124 is released, this prevents the learner's reactivation of shutter 155 for a succeeding question, unless he makes an error on that question.

The operator then inserts another coin in the slot 123 corresponding to the answer he now believes to be correct. Assuming that the correct slot has been selected, the coin 170 will then roll across the inclined plate 138, through the slot 171 in the web 145, opening 172 in the sleeve 135 and into the recess 173 in the drive cylinder 131. Upon operation of the handle 124 the coin 170 then acts as a key to lock the sleeve 135 and drive cylinder 131 together for rotation through a 90° arc as a unit. Rotation of the sleeve 135 causes the web 145 to be advanced to present a new problem in the window opening 121. When the drive cylinder 131 has rotated to its lowermost position illustrated in FIGURE 7 and the handle 124 is released, the coin 170 is released and rolls through the chute 178 to the tray 125 where it may be recovered. Upon release of the handle 124 the drive cylinder 131 is returned to its initial position relative to the sleeve 135 which remains stationary.

Shutter 142 in FIGURE 5 is connected to shaft 130 by suitable cam means (not shown), so that whenever handle 124 is pulled downward, shutter 142 instantly drops to completely cover the web section framed by window 121. This action prevents the learner from seeing the aperture 171 when the next problem on web 145 is being positioned behind window 121. When handle 124 is released, shutter 142 is raised and the learner then sees the indicia but not the aperture 171 which is now positioned behind slot 123.

It will now be observed that the present invention provides an educational device for either simple or complex exercises which may be manufactured and sold at relatively low cost to adapt it for extensive use. It will also be observed that the present invention provides an educational device in the nature of a game to provide a strong motivating appeal, discourage guessing and automatically actuate reinforcing mechanism and advance successive problems to be solved by the operator of the device. It will further be observed that the present invention provides an educational device adapted for a number of different uses in solving successive steps of a single problem or selecting a single one of a plurality of answers. It will still further be observed that the present invention provides an educational device which is of relatively simple construction and one which is reliable in operation.

While a number of embodiments of the invention are herein illustrated and described, it will be understood that additional changes may be made in the structure and arrangement of elements without departing from the spirit or scope of the invention. Therefore, without limitation in this respect, the invention is defined in the followng claims.

I claim:

1. An educational device for assisting an individual in learning comprising a casing having at least one window opening therein, coin slots in the casing, means including at least one movable element having indicia thereon for presenting a series of problems in the window opening and having an aperture for each problem, said aperture having a predetermined relation to one of the coin slots and the subject matter of the problem, a source of power for advancing the movable element, and means including a coin inserted in one of the slots for providing a connection between the source of power and the movable element, selection of the proper coin slot by the operator enabling the aperture associated with it to permit the coin to complete the connection between the source of power and the movable element.

2. An educational device for assisting an individual in learning in accordance with claim 1, in which the movable element is a continuous web having indicia thereon for presenting a series of problems successively in the window opening and an aperture for each problem at spaced locations across the web.

3. An educational device in accordance with claim 2 in which receptacles are provided for receiving coins inserted in the coin slots.

4. An educational device in accordance with claim 2 in which a magazine is provided for additional coins, and means operated by movement of the manually operable member to intermittently dispense coins from the magazine as a reward.

5. An educational device for assisting an individual in learning comprising a casing having at least one window opening therein, reels adjacent the top and bottom of the window opening, a continuous web of an electric insulating material between the reels and having indicia thereon for presenting a series of problems successively in the window opening and an aperture for each problem, an electric motor connected to rotate one of the reels to advance the web, a source of electric current, a plurality of selective open branch circuits connected at one end to the source of electric current, each of said branch circuits having a contact bearing against said web and spaced contacts therein, a contact bar engaged by one of said bearing contacts through the aperture in the web and connected to the motor, a coin slot adjacent each of said branch circuits, each coin inserted in a slot bridging the spaced contacts in its corresponding branch circuit to complete the motor circuit through the bearing contact in alignment with the aperture, a manually operable member, and a switch common to all of said branch circuit operated by said member.

6. An educational device in accordance with claim 5 in which the means for controlling the advance of the web comprises the member, a holding circuit in parallel with the branch circuits, a switch in said holding circuit at one side of the web, and a tab extending laterally from the web to pass between the contacts of said switch to open the holding circuit when a new series of problems is positioned in the window opening.

7. An educational device in accordance with claim 5 in which the plurality of selective open branch circuits have a part mounted for movement, and means connected for operation by the manually operable member to move the part and dump a coin therefrom.

8. An educational device in accordance with claim 5 in which a mechanism is provided for holding coins to be dispensed as a reward, a slide for controlling the dispensing of coins from the magazine, and connecting means for actuating said slide upon operation of said member.

9. An educational device for assisting an individual in learning comprising a casing having at least one window opening therein, a continuous web having indicia thereon for presenting a series of problems in the window opening, successively, and an aperture for each problem, selective coin slots in the casing, a drive cylinder mounted in said casing and having a recess at the rear of said slots, a sleeve rotatable on said cylinder and having a coin opening overlying the recess, guide means for maintaining said web in frictional contact with the sleeve to locate the aperture therein over the opening in the sleeve and recess in the cylinder, respectively, said web preventing a coin from passing therethrough except when the aperture therein aligns with the slot into which the coin is inserted and permitting the coin to pass through the opening in the sleeve and into the recess in the cylinder when the aperture aligns with the slot corresponding to the correct answer, a manually operable member for oscillating the drive cylinder, and said coin locking the sleeve to the cylinder for rotation therewith when the coin is in the recess in the cylinder and projects through the opening in the sleeve.

10. An educational device in accordance with claim 9 in which a chute is provided adjacent the web through which the coin is returned as it falls from the recess in the drive cylinder at the end of its forward movement.

11. An educational device in accordance with claim 10 in which the drive cylinder is oscillated relative to the sleeve when the coin is supported by the web, a closed compartment adjacent the drive cylinder, and means actuated by the manually operable member for displacing the coin from the web into a closed compartment.

12. An educational device in accordance with claim 9 in which a second window opening is provided in the casing, said web having indicia thereon for exposure in the second window opening to indicate an incorrect answer, a shutter normally closing the second window opening, means actuated by the manually operable member to open the shutter.

13. An educational device in accordance with claim 9 in which a magazine for coins is provided, a recess in the sleeve overlying the magazine, an opening in the web at spaced locations for permitting coins to fall from the magazine into the recess in the sleeve, and means including a tray for receiving coins dispensed from the magazine as a reward for the correct answers.

References Cited by the Examiner

UNITED STATES PATENTS

| | | | |
|---|---|---|---|
| 2,255,521 | 9/1951 | Watling | 35—9 |
| 2,826,828 | 3/1958 | Hamilton | 35—9 |
| 2,953,859 | 9/1960 | Fink | 35—9 |
| 3,212,199 | 10/1965 | Clark | 35—9 |

EUGENE R. CAPOZIO, *Primary Examiner.*

S. M. BENDER, W. W. NIELSEN, *Assistant Examiners.*